United States Patent
Kojima et al.

(10) Patent No.: US 8,730,395 B2
(45) Date of Patent: May 20, 2014

(54) HISTORY INFORMATION RECORDING DEVICE AND IMAGE DISPLAY EQUIPMENT INCLUDING THE SAME

(75) Inventors: Masayoshi Kojima, Daito (JP); Shigenori Shimomura, Shijyonawate (JP); Kazuhiko Ikazuchi, Daito (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 429 days.

(21) Appl. No.: 12/767,996

(22) Filed: Apr. 27, 2010

(65) Prior Publication Data

US 2010/0271547 A1 Oct. 28, 2010

(30) Foreign Application Priority Data

Apr. 27, 2009 (JP) .................... 2009-107233

(51) Int. Cl.
- H04N 7/00 (2011.01)
- H04N 11/00 (2006.01)
- H04N 9/47 (2006.01)
- H04N 7/18 (2006.01)
- H04N 17/00 (2006.01)
- H04N 17/02 (2006.01)

(52) U.S. Cl.
USPC ............... 348/552; 348/86; 348/92; 348/180

(58) Field of Classification Search
None
See application file for complete search history.

(56) References Cited

U.S. PATENT DOCUMENTS

| | | | |
|---|---|---|---|
| 6,546,294 B1* | 4/2003 | Kelsey et al. | 700/27 |
| 2003/0212994 A1* | 11/2003 | Fitzsimmons et al. | 725/9 |
| 2008/0303961 A1 | 12/2008 | Shioji | |
| 2010/0229093 A1* | 9/2010 | Matsubayashi | 715/716 |

FOREIGN PATENT DOCUMENTS

| | | | |
|---|---|---|---|
| JP | 2000-228780 A | 8/2000 | |
| JP | 2002-144984 A | 5/2002 | |
| JP | 2004-537186 A | 12/2004 | |
| JP | 2006-094174 A | 4/2006 | |
| JP | 2008-306255 A | 12/2008 | |
| WO | 02/076100 A2 | 9/2002 | |

* cited by examiner

Primary Examiner — Jefferey Harold
Assistant Examiner — Michael Teitelbaum
(74) Attorney, Agent, or Firm — Westerman, Hattori, Daniels & Adrian, LLP

(57) ABSTRACT

A history information recording device is provided to an image display equipment, for recording, as history information, information about operations that have been executed in the image display equipment up to a present time. The history information recording device includes a connection terminal to which an external storage medium is connected, in which the history information is transmitted to and recorded on the external storage medium connected to the connection terminal in response to a given instruction. Therefore, it is possible to check the history information of the image display equipment without displaying the history information on a screen of the image display equipment.

8 Claims, 4 Drawing Sheets

FIG.2

- MODEL NUMBER INFORMATION : ABCD
- POWER-ON COUNT INFORMATION: 165 TIMES
- INPUT SOURCE-BASED TOTAL DISPLAY TIME INFORMATION
    1. (ANALOG RF INPUT)  : 10 HOURS
    2. (DIGITAL RF INPUT) : 500 HOURS
    3. (VIDEO INPUT 1)    : 3 HOURS
    4. (VIDEO INPUT 2)    : 2 HOURS
    5. (VIDEO INPUT 3)    : 0 HOURS
    6. (HDMI INPUT 1)     : 2 HOURS
    7. (HDMI INPUT 2)     : 0 HOURS
    8. (HDMI INPUT 3)     : 0 HOURS
    9. (PC INPUT)         : 0 HOURS
- ACTIVE INPUT FLAG : 2

FIG.4

```
Model Number = ABCD
The Number of Reboot = 165
Looking and listening time of each input mode
- Analog RF
- Digital RF
- Video 1
- Video 2
- Video 3
- HDMI 1
- HDMI 2
- HDMI 3
- PC
Last mode = Digital RF
```

HISTORY INFORMATION RECORDING DEVICE AND IMAGE DISPLAY EQUIPMENT INCLUDING THE SAME

CROSS-REFERENCE TO RELATED APPLICATIONS

The subject application has been made based on Japanese Patent Application No. 2009-107233, which was filed on Apr. 27, 2009 in Japan and is incorporated herein by reference in its entirety.

BACKGROUND OF THE INVENTION

1. Field of the Invention

The present invention relates to a history information recording device for recording an operation history and the like of an image display equipment, and an image display equipment that includes the history information recording device.

2. Description of the Related Art

In recent years, image display equipments, such as TV receivers (television receivers), have been increasingly becoming diverse in terms of function, performance, and other aspects. Such diversity allows consumers planning to purchase an image display equipment to select a product that fits their own styles (e.g., the situation in which the image display equipment is used).

Users sometimes return image display equipments they purchased for various reasons including some kind of dissatisfaction with the product. When this happens, the manufacturer of a returned image display equipment would need to find out what the user's dissatisfaction was about in order to gain insight for improving function and quality in a new model of the product.

However, users do not always state the specifics of the reasons for dissatisfaction or return clearly. Some image display equipments address the issue by recording operation history information (history information), such as the number of times the equipment has been turned on and the total equipment running time, on a built-in flash memory or other recording media.

If a user returns an image display equipment of this type, history information recorded on the flash memory may be displayed on the screen of the image display equipment with, for example, a special keystroke. An inspector or other persons can thus check information regarding how the image display equipment has been used by the user, and infer or study the sources of dissatisfaction on the part of the user.

The above-mentioned type of image display equipment that is designed to display history information can usually display history information correctly but will not be able to do so if the image display equipment has lost the ability for normal screen display (for example, due to a damaged display panel). Replacing the panel may give back the ability to display history information to the image display equipment. In practice, however, the replacing requires additional steps such as preparing a new panel and changing the old panel with the new one, and will be concluded as not favorable. An image display equipment is therefore desirably designed such that history information of the image display equipment can be checked without being displayed on the screen of the image display equipment.

SUMMARY OF THE INVENTION

A history information recording device according to the present invention is provided to an image display equipment, for recording, as history information, information about operations that have been executed in the image display equipment up to a present time. The history information recording device includes: a connection terminal to which an external storage medium is connected, in which the history information is transmitted to and recorded on the external storage medium connected to the connection terminal in response to a given instruction.

An image display equipment according to the present invention includes a plurality of types of input terminals to which video signals are input, and displays video information obtained through one of the plurality of types of the input terminals, the one of the plurality of types of the input terminals being set active in accordance with a user's instruction. The image display equipment may include: a history information recording unit for recording, as history information, information about operations that have been executed by the image display equipment up to a present time; a USB connection terminal compliant with a USB standard; and an operation unit for receiving an operation. The history information recording unit may be configured to: record, as the history information for each of the plurality of types of the input terminals, a total display time of the video information obtained through the input terminal; record, as the history information, a type of an input terminal that was used last to obtain the video information; and transmit, when a specific operation is performed on the operation unit, the history information to a USB memory connected to the USB connection terminal, and cause the USB memory to record the history information.

DESCRIPTION OF THE DRAWINGS

The above-mentioned and other objects, as well as features, of the present invention will be understood more clearly from the following description on a preferred embodiment, especially when taken in conjunction with the accompanying drawings in which:

FIG. 2 is an explanatory diagram on contents of history information;

FIG. 4 is an explanatory diagram on how displayed history information looks.

DESCRIPTION OF THE PREFERRED EMBODIMENTS

An embodiment of the present invention is described below, taking a television receiver which is a type of image display equipment as an example.

Figure 1:
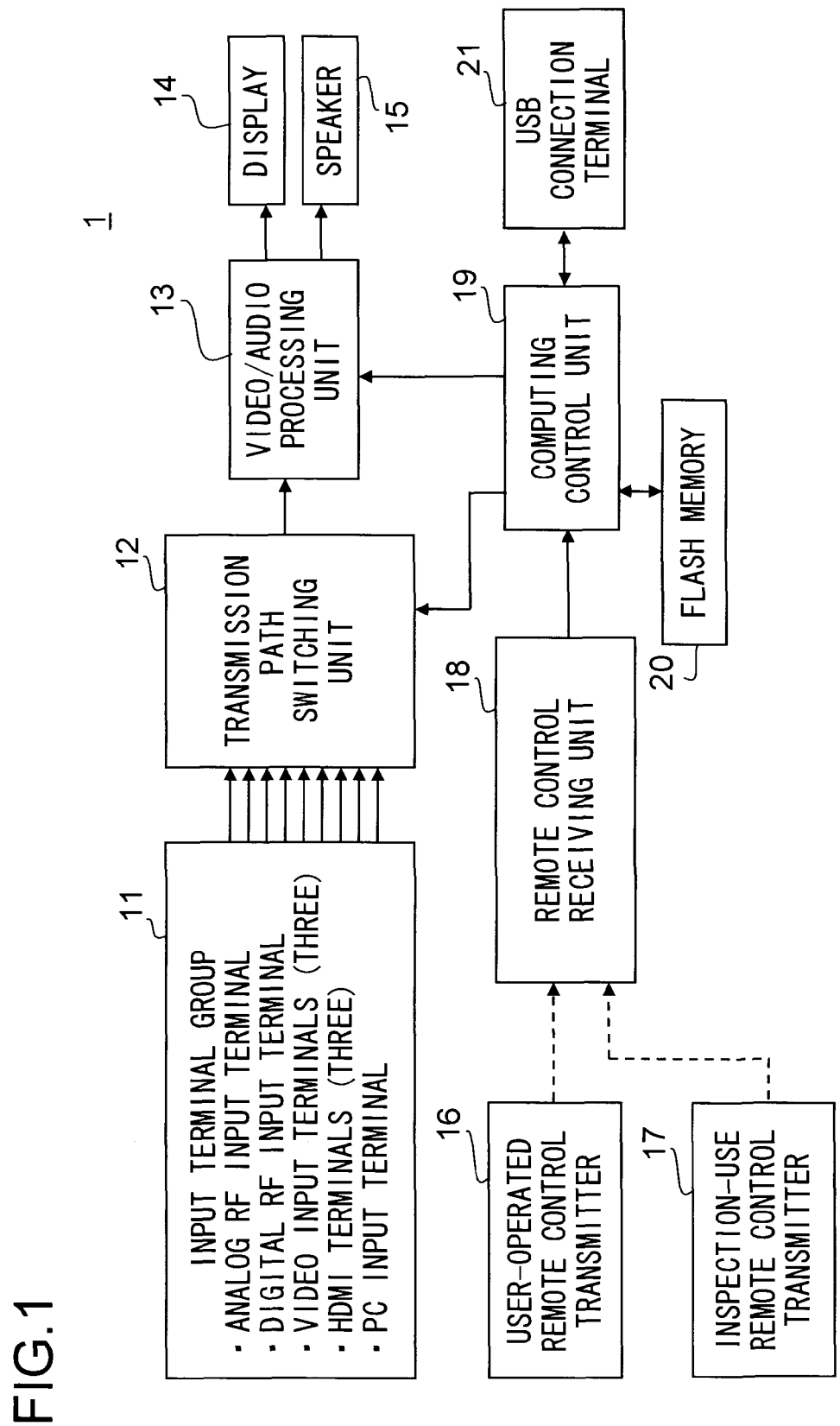
FIG. 1 is a configuration diagram of a television receiver according to an embodiment of the present invention.

FIG. 1 is a configuration diagram of this television receiver. As illustrated in FIG. 1, a television receiver 1 includes an input terminal group 11, a transmission path switching unit 12, a video/audio processing unit 13, a display 14, a speaker 15, a user-operated remote control transmitter 16, an inspection-use remote control transmitter 17, a remote control receiving unit 18, a computing control unit 19, a flash memory 20, and a USB connection terminal 21, among others.

The input terminal group 11 includes various input terminals for receiving an input of video signals and audio signals from the outside. More specifically, the input terminal group 11 includes an analog RF input terminal to which analog RF signals (analog broadcast signals) are input, a digital RF input terminal to which digital RF signals (digital broadcast signals) are input, three video input terminals to which video signals of given format (for example, component format) are input, three HDMI terminals to which video and audio signals compliant with HDMI standards are input, and a PC input terminal to which PC signals are input.

The transmission path switching unit 12 is connected on the upstream side to the various input terminals of the input terminal group 11, and is connected on the downstream side to the video/audio processing unit 13. The transmission path switching unit 12 connects any one of the input terminals of the input terminal group 11 to the video/audio processing unit 13 in a switchable manner in accordance with an instruction given by the computing control unit 19. As is described later, the transmission path switching unit 12 enables the television receiver 1 to switch the input terminal that is connected to the video/audio processing unit 13 (i.e., active input terminal) and set another input terminal as the active input terminal in accordance with an instruction given by a user.

The video/audio processing unit 13 performs necessary processing such as tuning processing and demodulating processing on a signal transmitted from the input terminal side, and outputs a resultant video signal to the display 14 and a resultant audio signal to the speaker 15. Video and audio carried on a signal that is input to the active input terminal are displayed and output in this manner. As described above, the television receiver 1 includes a plurality of types of input terminals to which video signals are input, and displays video information obtained through one of those input terminals that is set active in accordance with an instruction from the user.

The user-operated remote control transmitter 16 is intended to be operated by a user (viewer) of the television receiver 1, and transmits by radio a remote control signal that is generated in accordance with the user's operation. By operating the user-operated remote control transmitter 16, the user may give various instructions (including instructions to switch between power on and off, to switch the broadcast channel that is received, and to switch the input terminal that is set active) to the television receiver 1.

The inspection-use remote control transmitter 17 is intended to be operated by an inspector or other persons in an inspection process of the television receiver 1 (e.g., an inspection process prior to the shipping of the product and an inspection process after the product is returned or recalled), and transmits by radio a remote control signal that is generated in accordance with the inspector's operation. The inspection-use remote control transmitter 17 includes special keys (including a "USB record: on" key described later) which are not provided on the user-operated remote control transmitter 16.

With the inspection-use remote control transmitter 17, an inspector or other persons can give various instructions regarding the inspection process to the television receiver 1. When the main body of the television receiver 1 is sold as a product, the inspection-use remote control transmitter 17 is not intended to be included in the product (is unavailable to common users) whereas the user-operated remote control transmitter 16 is intended to be included in the product as an accessory item (is available to common users).

The remote control receiving unit 18 receives a remote control signal sent from the user-operated remote control transmitter 16 or from the inspection-use remote control transmitter 17, and transmits information contained in the remote control signal to the computing control unit 19.

The computing control unit 19 is built from, for example, a CPU to execute various types of processing necessary for the television receiver 1 to implement its functions. Specifics of main processing executed in the television receiver 1 are described later.

The flash memory 20 is a rewritable, non-volatile memory, and records a program for running the CPU and history information, among others. The history information includes, as illustrated in FIG. 2, the following information: "model number information" which indicates the serial number or model number of the television receiver 1; "power-on count information" which indicates the number of times the television receiver 1 has been switched from a power-off state to a power-on state; "input source-based total display time information" which indicates the total image display time separately for each input terminal type used; and "active input flag" which indicates an input terminal that is currently set as the active input terminal.

According to the history information of FIG. 2, the model number is "ABCD", the number of times the television receiver 1 has been switched from the power-off state to the power-on state up to the present time is "165", and the input terminal that is currently set active is the digital RF input terminal (input terminal having the number "2"). The total time of image display that is executed with the use of, for example, the digital RF input terminal (by way of video signals input from the digital RF input terminal) is "500" hours.

The USB connection terminal 21 is a terminal compliant with universal serial bus (USB) standards, and detachably connects a USB memory that comes with the television receiver 1, or a common USB memory. Instead of the USB connection terminal 21, the television receiver 1 may employ a terminal that connects other types of external storage media than a USB memory. The computing control unit 19 is capable of reading and writing various types of information with respect to a USB memory connected to the USB connection terminal 21.

The USB connection terminal 21 enables the television receiver 1 to display video data (e.g., JPEG data of a photograph taken with a digital camera) recorded on a USB memory that is connected thereto on the display 14. Further, history information or other data recorded on the flash memory 20 may be recorded on a USB memory that has a given level of free capacity upon connection to the USB connection terminal 21.

Figure 3:
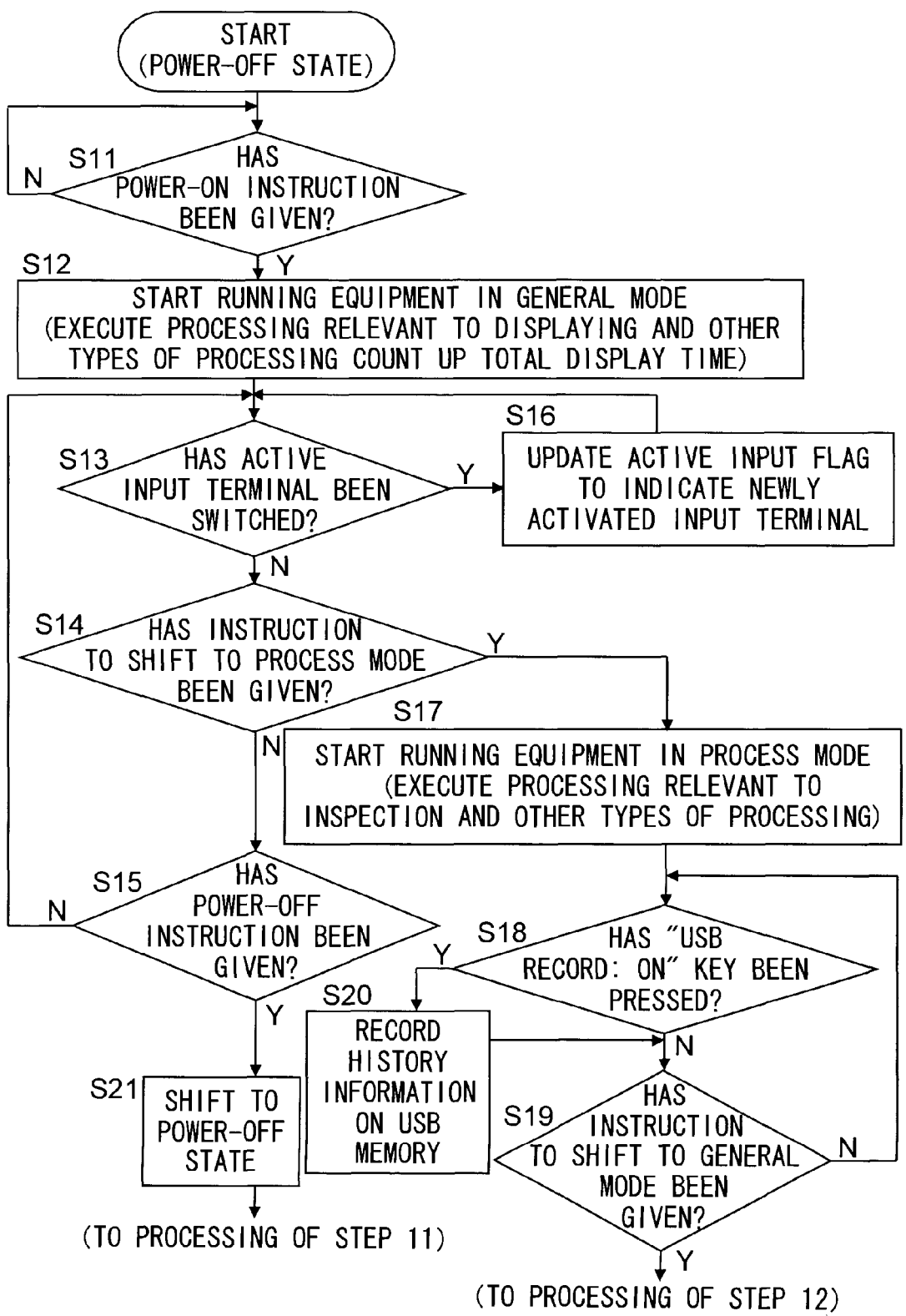
FIG. 3 is a flow chart of main operations executed in the television receiver.

Next, main operations executed in the television receiver 1 are described below with reference to a flow chart of FIG. 3. As is clarified in the following description, the operating mode of the television receiver 1 is set to any one of a general mode and a process mode in a switchable manner.

The computing control unit 19 in the power-off state (a state where video display or a similar operation is not being executed and power consumption is kept small) waits for an instruction to power on the television receiver 1 (Step S11). Receiving a power-on instruction (Y in Step S11), the computing control unit 19 puts the television receiver 1 into the power-on state and causes the television receiver 1 to start running in the general mode (a mode in which the television receiver 1 is intended to be used by a user in a normal fashion) (Step S12).

In the general mode, the computing control unit 19 continually executes the display and output of video and audio carried on signals that are input to the currently active input terminal (the active input terminal immediately after the television receiver 1 is powered on is an input terminal that was set active last the last time the television receiver 1 was in the power-on state). The computing control unit 19 also waits for the reception of a remote control signal from the user-operated remote control transmitter 16, and executes various operations (the switching of the broadcast channel to receive, the switching of the active input terminal, and the like) in accordance with a content of the received remote control signal (i.e., instruction content from the user).

Further, in the general mode, the computing control unit 19 continually performs the count-up of the input source-based total display time information (adds up time) for the input terminal that is currently set active. For example, in the case where the history information is as illustrated in FIG. 2 at the time of shifting to the general mode, the computing control unit 19 starts the count-up of the input source-based total display time information for the digital RF input terminal (currently active input terminal) from the present state (500 hours).

The count-up of input source-based total display time information is executed as long as images of actually input video signals are displayed on the display 14. In other words, while one of the input terminals is set active but no video signals are input to this input terminal, the count-up of input source-based total display time information is not performed for the input terminal. This way, the television receiver 1 records for each type of input terminal the total display time of video information that is obtained through the input terminal as input source-based total display time information.

For the duration of a period in which the television receiver 1 is run in the general mode, the computing control unit 19 monitors whether the active input terminal has been switched (Step S13), whether an instruction to shift to the process mode has been given (Step S14), and whether an instruction to power off the television receiver 1 has been given (Step S15).

The "process mode" is a special mode for such situations as the one in which the television receiver 1 is inspected by an inspector or other persons, and is usually of no use to common users. An instruction to shift to the process mode (Step S14) is therefore given by pressing a "process mode: on" key which is provided on the inspection-use remote control transmitter 17, and cannot be given through the user-operated remote control transmitter 16.

In the case where the effective input terminal has been switched (Y in Step S13), the computing control unit 19 updates the active input flag in the history information so that the newly activated input terminal is indicated by the active input flag (Step S16). For example, in the case where the analog RF input terminal is newly activated when the history information is as illustrated in FIG. 2, the active input flag is updated with "1" ("1" represents the analog RF input terminal). After that, Step S13 is repeated.

Because there has been a switch of the active input terminal, the computing control unit 19 changes the input source-based total display time information to be counted up so as to correspond to the input terminal that is newly activated. The change is executed by ceasing the ongoing count-up of the input source-based total display time information for the old active input terminal and starting the count-up of the input source-based total display time information for the new active input terminal.

In the case where an instruction to shift to the process mode has been given (Y in Step S14), the computing control unit 19 causes the television receiver 1 to stop running in the general mode and to start running in the process mode (Step S17). In the process mode, the flash memory 20 retains recorded contents of the flash memory 20 immediately before the shift to the process mode. Various operations relevant to the inspection or the like of the television receiver 1 (e.g., a test operation in accordance with an instruction) are executed in the process mode.

For the duration of a period in which the television receiver 1 is run in the process mode, the computing control unit 19 monitors whether the "USB record: on" key has been pressed (special keystroke) on the inspection-use remote control transmitter 17 (Step S18), and whether an instruction to shift to the general mode has been given (Step S19). In the case where the "USB record: on" key has been pressed, in other words, when a remote control signal that is associated with this key has been received (Y in Step S18), the computing control unit 19 transmits history information recorded on the flash memory 20 to a USB memory that is connected to the USB connection terminal 21, and causes the USB memory to record the history information (Step S20).

History information at the time is thus copied to the connected USB memory. In the case where a USB memory is not connected to the USB connection terminal 21, the computing control unit 19 waits until a USB memory is connected and then executes the processing of Step S20. During the wait, a message informing that no USB memory is connected may be displayed on the display 14, or a given alarm sound may be output from the speaker 15.

In the case where an instruction to shift to the general mode has been given through the operation of the inspection-use remote control transmitter 17 or other measures (Y in Step S19), the computing control unit 19 causes the television receiver 1 to stop running in the process mode and returns to the processing of Step S12. In the process mode, currently recorded history information may be reset in response to a given instruction.

In the case where an instruction to power off the television receiver 1 has been received (Y in Step S15), the computing control unit 19 puts the television receiver 1 into the power-off state (Step S21) and returns to the processing of Step S11. In the power-off state, the flash memory 20 retains recorded contents of the flash memory 20 immediately before the shift to the power-off state.

The television receiver 1 which executes the series of operations described above is capable of recording history information on a USB memory. This enables an inspector or other persons to connect the USB memory on which the history information has been recorded to another display device which is not the television receiver 1, and hence the history information is displayed on this display device and checked for its contents. The history information is displayed, for example, as illustrated in FIG. 4.

The inspector or other persons can thus use the contents of history information as reference in inferring or studying sources of the user's dissatisfaction with the television receiver 1 and reasons for return. For instance, from the history information, an input terminal that has been used frequently to input video signals (input terminal that has a long total display time) maybe identified, and from which input terminal the video and audio frequently viewed and listened to by the user (video and audio that have made an impression on the user's mind) have been input may accordingly be determined. It is then deduced that some circumstances around the frequently used input terminal (for example, video input to the input terminal tends to be blurred) are likely to be sources of dissatisfaction and reasons for return on the user's part.

To give another example, from the history information, an input terminal that has been set active last may be identified, and from which input terminal the video and audio viewed and listened to by the user last have been input may accordingly be determined. It is then deduced that circumstances surrounding this input terminal, too, are likely to be sources of dissatisfaction and reasons for return on the user's part. By figuring out the situation in which the user has used the television receiver 1 in this manner, sources of dissatisfaction and reasons for return on the user's part may be inferred or studied to make full use thereof for improvement in a future product.

The history information may also be used as a material for finding out the type of the input terminal that is used frequently. This allows a manufacturer to design such a future product that, for example, an input terminal expected to be in frequent use is positioned in a place that is easy for a user to use.

The operation of recording history information on a USB memory (Step S20) is executed by pressing a "process mode: on" key to shift to the process mode and further pressing the "USB record: on" key. In this manner, by taking double guarding measures against accidental execution of this operation by common users, unintended recording of history information on a USB memory is prevented. As a result, it is possible to avoid recording history information, which is of no use to users, on a USB memory where information important to a user is recorded.

The remote control receiving unit 18, the computing control unit 19, the flash memory 20, and the USB connection terminal 21 in the television receiver 1 described above may together constitute a device that is provided in association with the television receiver (image display equipment) to record, as history information, information about operations that have been executed in the television receiver 1 up to the present time (history information recording device). Further, the history information recording device includes the USB connection terminal 21 to which a USB memory (external storage medium) is to be connected, and transmits the history information to the USB memory connected to the USB connection terminal 21 in response to the press of the "USB record: on" key (given instruction), thereby causing the USB memory to record the history information.

With this history information recording device, the history information may therefore be displayed on, for example, another display device by connecting the USB memory on which the history information is recorded to the display device. This allows an inspector or other persons to check history information of the television receiver 1 without needing to display the history information on the display 14. The inspector or other persons can accordingly check the history information with ease even when the television receiver 1 is no longer capable of normal screen display.

The television receiver 1 may be regarded as an equipment that includes a plurality of types of input terminals to which video signals are input, and displays video information obtained through one of those input terminals that is set active in accordance with a user's instruction, and further includes the history information recording device described above. This history information recording device records, for each type of input terminals, as input source-based total display time information (part of history information), the total display time of video information that is obtained through the input terminal. The history information recording device also records the type of the input terminal that was used last to obtain video information as the active input flag (part of history information).

A description has now been given on an example of the embodiment of the present invention. However, the present invention is not limited to what has been described above. The embodiment may be modified in various ways without departing from the spirit of the present invention.

It should be noted that the present invention has an object to provide the history information recording device which enables checking the history information of the image display equipment without displaying the history information on the screen of the image display equipment, and the image display equipment including the history information recording device.

In order to achieve the above-mentioned object, the history information recording device according to the present invention is provided to the image display equipment, for recording, as history information, information about operations that have been executed in the image display equipment up to the present time. The history information recording device includes a connection terminal to which an external storage medium is connected, in which the history information is transmitted to and recorded on the external storage medium connected to the connection terminal in response to a given instruction.

According to this configuration, the history information is recorded on the external storage medium, and then, for example, the history information is displayed on another display device or the like by connecting the external storage medium to the display device. The history information of the image display equipment may thus be checked without displaying the history information on the screen of the image display equipment. The history information may accordingly be checked with ease even when the image display equipment is no longer capable of normal screen display.

Further, as the configuration described above, more specifically, the connection terminal may be formed as a terminal compliant with a USB standard, and the history information recording device may transmit the history information to a USB memory that is connected to the connection terminal, and cause the USB memory to record the history information.

Further, the image display equipment according to the present invention includes a plurality of types of input terminals to which video signals are input, and displays video information obtained through one of the plurality of types of the input terminals, the one of the plurality of types of the input terminals being set active in accordance with a user's instruction. The image display equipment includes the history information recording device having the above-mentioned configuration, and the history information recording device records, as the history information for each of the plurality of types of the input terminals, a total display time of the video information obtained through the input terminal.

According to this configuration, which type of input terminal has been used frequently may be checked based on the history information. The history information may thus be of great help in inferring or studying sources of dissatisfaction, reasons for return, and the like on the part of a user who has used the image display equipment.

Further, in the above-mentioned configuration, the history information recording device may record, as the history information, a type of an input terminal that was used last to obtain the video information.

According to this configuration, which type of input terminal has been used frequently may be checked based on the history information. The history information may thus be of great help in inferring or studying sources of dissatisfaction, reasons for return, and the like on the part of a user who has used the image display equipment.

Further, in the above-mentioned configuration, the image display equipment may further include an operation unit for receiving an operation. When a specific operation is performed on the operation unit, the history information recording device may transmit the history information to an external storage medium connected to the connection terminal, and cause the external storage medium to record the history information.

According to this configuration, accidental recording of the history information on an external storage medium may be avoided as much as possible by setting, as the specific operation, an operation that would not be executed easily by common users (for example, a given operation that uses a special remote control transmitter unavailable to common users).

Further, the image display equipment according to the present invention includes a plurality of types of input terminals to which video signals are input, and displays video information obtained through one of the plurality of types of the input terminals, the one of the plurality of types of the input terminals being set active in accordance with a user's instruction. The image display equipment may include: a history information recording unit for recording, as history information, information about operations that have been executed by the image display equipment up to a present time; a USB connection terminal compliant with a USB standard; and an operation unit for receiving an operation. The history information recording unit may be configured to: record, as the history information for each of the plurality of types of the input terminals, a total display time of the video information obtained through the input terminal; record, as the history information, a type of an input terminal that was used last to obtain the video information; and transmit, when a specific operation is performed on the operation unit, the history information to a USB memory connected to the USB connection terminal, and cause the USB memory to record the history information.

Further, in the above-mentioned configuration, the history information recording unit may be configured to: set any one of a general mode and a process mode in a switchable manner as an operating mode; execute a shift from one mode to another mode in accordance with the operation performed on the operation unit; record, as the history information for the each of the plurality of types of the input terminals, the total display time of the video information obtained through the input terminal in the general mode; record, as the history information, the type of the input terminal that was used last to obtain the video information in the general mode; and in the process mode, transmit the history information to the USB memory connected to the USB connection terminal, and cause the USB memory to record the history information.

Further, in the above-mentioned configuration, the operation unit may include a user-operated remote control transmitter and an inspection-use remote control transmitter, and receive operations from both of the user-operated remote control transmitter and the inspection-use remote control transmitter. Meanwhile, the inspection-use remote control transmitter may be capable of receiving an operation for executing a shift from the general mode to the process mode, whereas the user-operated remote control transmitter may be incapable of receiving the operation for executing the shift.

What is claimed is:

1. An image display equipment, which includes a plurality of types of input terminals to which video signals are input, and displays video information obtained through one of the plurality of types of the input terminals, the one of the plurality of types of the input terminals being set active in accordance with a user's instruction,
   wherein the image display equipment comprises a history information recording device, which is provided to an image display equipment, for recording, as history information, information about operations that have been executed in the image display equipment up to a present time,
   the history information recording device comprising a connection terminal to which an external storage medium is connected,
   wherein the history information is transmitted to and recorded on the external storage medium connected to the connection terminal in response to a given instruction, and
   wherein the history information recording device records, as the history information for each of the plurality of types of the input terminals, a total display time of the video information obtained through the input terminal,
   wherein the history information is information that is transmitted from the external storage medium to a display equipment other than the image display equipment and is displayed on that display equipment.

2. The image display equipment according to claim 1,
   wherein the connection terminal is formed as a terminal compliant with a USB standard, and
   wherein the history information recording device transmits the history information to a USB memory that is connected to the connection terminal, and causes the USB memory to record the history information.

3. The image display equipment according to claim 1, wherein the history information recording device records, as the history information, a type of an input terminal that was used last to obtain the video information.

4. The image display equipment according to claim 1, further comprising an operation unit for receiving an operation,
   wherein, when a specific operation is performed on the operation unit, the history information recording device transmits the history information to an external storage medium connected to the connection terminal, and causes the external storage medium to record the history information.

5. An image display equipment, which includes a plurality of types of input terminals to which video signals are input, and displays video information obtained through one of the plurality of types of the input terminals, the one of the plurality of types of the input terminals being set active in accordance with a user's instruction,
   wherein the image display equipment comprises:
   a history information recording unit for recording, as history information, information about operations that have been executed by the image display equipment up to a present time;
   a USB connection terminal compliant with a USB standard; and
   an operation unit for receiving an operation,
   wherein the history information recording unit is configured to:
     record, as the history information for each of the plurality of types of the input terminals, a total display time of the video information obtained through the input terminal;
     record, as the history information, a type of an input terminal that was used last to obtain the video information; and
     transmit, when a specific operation is performed on the operation unit, the history information to a USB memory connected to the USB connection terminal, and cause the USB memory to record the history information.

6. The image display equipment according to claim 5, wherein the history information recording unit is configured to:
- set anyone of a general mode and a process mode in a switchable manner as an operating mode;
- execute a shift from one mode to another mode in accordance with the operation performed on the operation unit;
- record, as the history information for the each of the plurality of types of the input terminals, the total display time of the video information obtained through the input terminal in the general mode;
- record, as the history information, the type of the input terminal that was used last to obtain the video information in the general mode; and
- in the process mode, transmit the history information to the USB memory connected to the USB connection terminal, and cause the USB memory to record the history information.

7. The image display equipment according to claim 6,
- wherein the operation unit comprises a user-operated remote control transmitter and an inspection-use remote control transmitter, and receives operations from both of the user-operated remote control transmitter and the inspection-use remote control transmitter, and
- wherein the inspection-use remote control transmitter is capable of receiving an operation for executing a shift from the general mode to the process mode, whereas the user-operated remote control transmitter is incapable of receiving the operation for executing the shift.

8. The image display equipment according to claim 7, wherein
- the inspection-use remote control transmitter has a "process mode: on" key which is used in an operation for executing a shift from the general mode to the process mode.

* * * * *